UNITED STATES PATENT OFFICE.

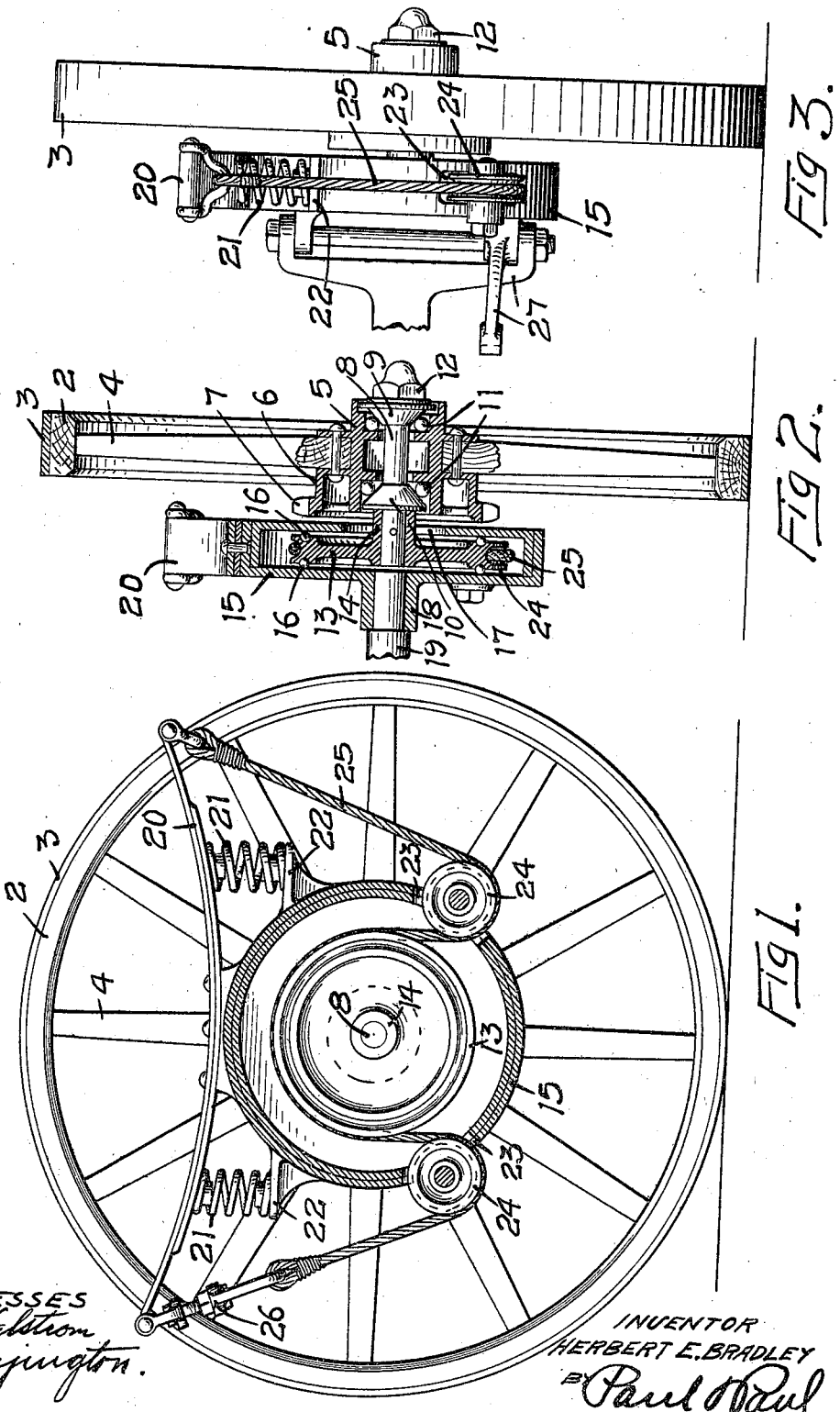

HERBERT E. BRADLEY, OF KALISPELL, MONTANA.

RUNNING-GEAR FOR VEHICLES.

975,392.  Specification of Letters Patent.  Patented Nov. 15, 1910.

Application filed October 25, 1909. Serial No. 524,506.

*To all whom it may concern:*

Be it known that I, HERBERT E. BRADLEY, of Kalispell, Flathead county, Montana, have invented certain new and useful Improvements in Running-Gears for Vehicles, of which the following is a specification.

The object of my invention is to provide a strong durable running gear adapted particularly for automobiles and other vehicles from which the ordinary pneumatic tire with the annoyance resulting from punctures and blow-outs is entirely eliminated.

A further object is to provide a running gear which will yieldingly support a vehicle body and permit it to ride easily over rough or uneven ground.

A further object is to provide a running gear of very simple construction, one which cannot easily get out of order and is composed of few parts which are easily accessible for examination or repairs.

My invention consists generally in interposing a yielding connection between the hub of the wheel and the axle.

Further, my invention consists in various constructions and combinations, all as hereinafter described and particularly pointed out in the claims.

In the accompanying drawing, forming a part of this specification, Figure 1 is a side elevation of a wheel, partly in section with my invention applied thereto. Fig. 2 is a transverse vertical sectional view through the center of the wheel. Fig. 3 is an edge view illustrating the application of the invention to a front wheel, and showing an application of the steering mechanism.

In the drawing, I have shown a wheel having a wooden rim 2, metal tire 3 and spokes 4, all of ordinary construction. 5 is a hub having a surface 6 for a brake-strap and a sprocket 7 formed on the inner end of the hub. 8 is a spindle or stub-shaft having cones 9 and 10 thereon which have ball bearings 11 in said hub. The outer end of the spindle has a nut 12 thereon as usual in automobile construction. The spindle projects at its inner end beyond the hub and the sprocket 7 and a sheave 13 having a hub 14 is secured on said spindle within a casing 15. Ball bearings 16 are provided between said sheave and the walls of the casing. The spindle on which the sheave is mounted and the hub 14 project through a comparatively large opening 17 provided in the outer wall of said casing. The inner wall of said casing has a hub 18 that is secured on the end of the main axle 19. The sheave slides freely up and down within the casing 15, limited in such movement by the engagement of its hub with the wall around the opening 17. A spring 20 of the leaf type, is mounted on the top of the casing 15. Coil springs 21 are carried by brackets 22 on said casing and are adapted to relieve the spring 20 or supplement it when subjected to severe strain. Openings 23 are provided in the wall of said casing and pulleys 24 are journaled in said openings on each side of said casing and the sheave 13. A cable 25 is attached at its ends to the spring 20 and passes down under the pulleys 24 and over the sheave 13 and a turn-buckle 26 is provided in said cable by means of which the proper degree of tension may be obtained.

In Fig. 3 I have illustrated the invention applied to the forward wheel of an automobile or other vehicle, the casing having the steering mechanism 27 connected therewith to permit oscillation of the forward wheel in the usual manner. In other respects the construction is the same as shown in Figs. 1 and 2.

In operation, the sheave will slide up and down in the casing 15 and when the wheel strikes an obstruction, will move upwardly with the wheel and the cable 25 will be put under tension, causing the springs 20 and 21 to yieldingly resist the upward movement of the wheel and form a cushion support therefor. I am thus able to use a non-puncturing tire on the wheel, either metal or solid rubber as preferred and at the same time derive all the advantages resulting from the cushion support of a pneumatic tire. In case the load on the axle causes the casing 15 to be depressed and the springs carried thereby lowered, said springs will nevertheless be put under tension by the downward movement of the pulleys 24 drawing on the cable 25 against the stationary sheave. The wheel and the load will thus be cushioned without the employment of springs in the construction of the wheel and without the use of a pneumatic tube.

There will be no danger of the stub or sleeve 14 pounding on the casing 15 under ordinary circumstances. This could only happen when the wheel is lifted by a severe jolt and raised from the ground. The springs under ordinary usage do not have a long vibration, but are comparatively short and have a quick movement and the opening is sufficiently large to prevent the sleeve 14 from either striking above or below when the springs are under proper tension. The chain belt for the sprocket wheel 7 is kept under uniform tension by an ordinary spring tightener. I have not thought it necessary to illustrate either the chain or the tightening means in this application.

I claim as my invention:—

1. A wheel and main axle therefor and means connecting the hub of said wheel with said axle, said means including a cable extending in a plane parallel substantially with the plane of said wheel and arranged to exert a downward pressure on said wheel, said cable sliding lengthwise and accommodating itself to the position of the wheel, and yielding means supported by said axle and attached to the ends of said cable.

2. A wheel and main axle therefor and means connecting the hub of said wheel with said axle, said means including a cable extending in a plane parallel substantially with the plane of said wheel and having a bearing intermediate to its ends arranged to exert a downward pressure on said wheel, and a spring carried by said axle and attached to the ends of said cable, for the purpose specified.

3. A wheel comprising a hub and stub axle journaled therein, a sheave secured on said stub axle, a main axle having a guide for said sheave, a cable arranged to exert a downward pressure on said sheave, and means attached to said cable and yieldingly resisting independent vertical movement of said sheave and said main axle and guide.

4. A wheel having a hub and stub axle journaled therein, and a sheave secured to said axle, a main axle and casing mounted thereon in which casing said sheave is adapted to slide, a cable arranged to exert a downward pressure on said sheave, and means attached to said cable and yieldingly resisting movement of said sheave in said casing.

5. A wheel having a hub and a stub axle journaled therein, a main axle and casing secured on said main axle and having a central opening in its wall to receive said stub axle, a sheave fitting within said casing and slidable therein, flexible means exerting a downward pressure on said sheave, and means yieldingly connecting said flexible means with said casing.

6. A wheel having a hub and stub axle journaled therein, a main axle, springs supported by said main axle, a sheave secured on said stub axle, a cable attached to said spring and bearing on said sheave and arranged to be put under tension by the upward movement of said stub axle or the downward movement of said main axle.

7. A wheel having a hub, a stub axle journaled therein, a sheave having a hollow face secured to said stub axle, a main axle and casing secured thereon forming a guideway for said sheave, pulleys journaled on said casing, a flat spring carried by said casing, a cable attached to the ends of said flat springs and extending under said pulleys and over said sheave.

8. A wheel having a hub, a stub axle provided therein, a sheave mounted on said stub axle, a main axle and casing secured thereon, leaf springs mounted on said casing, coiled springs provided on each side of the support of said leaf springs on said casing and supplementing the same, pulleys mounted on said casing, and a cable attached at its ends to said leaf springs and extending under said pulleys and over said sheave.

In witness whereof we have hereunto set our hands this 20th day of October 1909.

HERBERT E. BRADLEY.

Witnesses:
C. F. GETCHELL,
J. E. COCKS.